United States Patent [19]

Mallay et al.

[11] Patent Number: 4,720,251

[45] Date of Patent: Jan. 19, 1988

[54] EXTRUSION DIE PLATE CONSTRUCTION

[75] Inventors: John B. Mallay; A. J. Johnson, both of Houston, Tex.

[73] Assignee: Muesco Mallay Houston Inc., Houston, Tex.

[21] Appl. No.: 924,116

[22] Filed: Oct. 30, 1986

Related U.S. Application Data

[63] Continuation of Ser. No. 644,202, Aug. 24, 1984, abandoned.

[51] Int. Cl.$^4$ .............................................. B02C 18/06
[52] U.S. Cl. ...................................... 425/67; 165/158; 264/142; 425/311; 425/464
[58] Field of Search ................. 425/67, 311, 313, 382, 425/462, 464, 465, 466, 463, 378 R; 264/142; 165/158, 69

[56] References Cited

FOREIGN PATENT DOCUMENTS 2457873  6/1975  Fed. Rep. of Germany ...... 165/158

Primary Examiner—Jay H. Woo
Assistant Examiner—J. Fortenberry
Attorney, Agent, or Firm—Browning, Bushman, Zamecki & Anderson

[57] ABSTRACT

An extrusion die assembly for a pelletizing apparatus including a die body, a die insert carried by the die body, the die insert having a die plate with a die plate face and a die plate back surface, there being a plurality of extrusion ports through the die plate face extending from the face to the back surface, the die insert further having a plurality of extrusion port formations such as tubes projecting from the die plate back surface and defining a plurality of extrusion passageways, each of said extrusion ports being in register with a respective one of said passageways, the tubes and the die plate comprising a monolithic structure formed from a unitary piece of material, and a heating jacket formed at least partially by the die body, at least a portion of the tubes being received in the heating jacket.

18 Claims, 6 Drawing Figures

EXTRUSION DIE PLATE CONSTRUCTION

This is a continuation of co-pending application Ser. No. 644,202 filed on Aug. 24, 1984 now abandoned.

BACKGROUND OF THE INVENTION

The present invention relates to an extrusion die. More specifically, the invention is directed to an extrusion die, of the pipe die type, which is particularly adapted to the extrusion of polymeric materials having high melting points.

Apparatus for the extrusion of thermoplastic pellets or granules is widely known. Generally, such apparatus includes an extruder adapted to feed a thermoplastic material in the molten state to an extruding die having a plurality of nozzles opening from a nozzle plate. As the thermoplastic material is extruded through the die nozzle in the form of rods or threads, the latter are cut transversely into small generally cylindrical fragments by means of a rotary cutter, e.g. knife or blade, which is adapted to rotate in sliding relation with the face of the nozzle plate.

It is generally necessary to heat the die in an attempt to obtain uniform heat distribution to each extrusion passageway to prevent the passageways from becoming plugged. If, for example, the temperature through any passageway(s) should drop below the desired critical temperature applicable to a particular thermoplastic material being extruded, the material may plug that passageway(s) and cause the remaining nozzles to extrude at an accelerated rate, thereby affecting the uniformity of the pellets formed by action of the rotating blades or knives. Accordingly, it is common practice to provide a heating jacket or cavity around the tubes or pipes which form the passageways through which the molten thermoplastic passes from the extruder to the nozzle plate. Circulated through this cavity or heating jacket is a heating medium, e.g. steam, whereby the tubes or pipes, and hence the thermoplastic material, are generally kept at a uniform, desired temperature, well above the point at which the thermoplastic materials will solidify. The problem of heat transfer to the tube is particular important when extruding thermoplastic materials having a high melt index. Such materials, for example some polyethylene, most polypropylenes and numerous other thermoplastic resins, have intrinsically high melting points. Accordingly, it is absolutely necessary that the tubes be kept at the desired temperature to prevent solidification.

In typical prior art extrusion dies of the tube or pipe type, such as for example that shown in U.S. Pat. No. 4,327,050, the tubes or pipes which form the extrusion passageway are received in bores in the die body and are in turn welded to the back side of a die plate member on the face of which is carried the nozzle plate. Generally, the tubes or pipes are also welded to the die body. In part, the welding between the tubes and the die plate member and the tubes and the die body seals the passageways in the tubes and die plate from the heating jacket such that (1) the heating medium in the heating jacket does not escape and mix with the extruding polymer and/or (2) the polymer is not forced into the cavity. Such leakage between the cavity and the tubes can cause the nozzles to extrude at varying rates, thereby affecting the uniformity of the pellets being formed by action of the rotating knives.

The welding of the tubes or pipes to the die plate member presents several difficulties. When in operation, the pressure internally of the tubes and die plate member is relatively high in order to form the thermoplastic material out through the nozzle plate. The temperature, both internally of the tubes and, of necessity, in the heating jacket surrounding the tubes, is also quite high. Because of the welding process, there remains even after post-weld heat treatment, a "heat affected zone" surrounding each tube. The combination of relatively cold water (140° F.) on the die face, high temperature heating media and high temperature polymer, pressure (3000 psi), causes the die body to flex. This distortion affects welded areas close to the die face which is closest to the cooler temperature water. This constant interaction of pressure and temperature gradients causes fatigue cracks in the welded tubes.

Additionally, any welded area has a slightly altered metallurgical chemistry due to different cooling rates in the weld puddle and depletion of the alloying elements caused by the heat of fusion. This altered chemistry is susceptible to corrosive attack by the cooling water and product impurities. Accordingly, stress corrosion cracking is often evident around the tubes welded in the die body.

SUMMARY OF THE INVENTION

It is therefore an object of the present invention to provide an improved extrusion die for the extrusion of granules or pellets of a thermoplastic material.

Another object of the present invention is to provide an improved die for pelletizing thermoplastic materials having a high melt index.

Still a further object of the present invention is to provide an improved extrusion die of the pipe die type.

The above and other objects of the present invention will become apparent from the drawings, the description given herein and the appended claims.

The extrusion die of the present invention includes a die body and a die insert carried by and preferably welded to the die body. The die insert has a die plate with a die plate face and a die plate back surface. At least one and preferably a plurality of ports extend through the die plate from the face to the back surface. The die insert further has at least one, and preferably a plurality, of extrusion port formations which project from the back surface of the die plate. The port formations define second ports each one of which communicates with and is in register with a respective one of the first ports in the die plate. The die plate and the extrusion port formation are integrally formed from a single workpiece of material and therefore comprise a monolithic structure. There is a cavity formed at least partially by the die body and, in the preferred case, by the die body and the die insert and at least a portion of the port formations are received or extend through the cavity, the cavity forming a heat jacket or heat exchange chamber. In the preferred case, the die plate face is overlayed with a nozzle plate of abrasion resistant material.

DETAILED DESCRIPTION OF THE PREFERRED EMBODIMENT

Reference is now made to the accompanying drawings for a detailed description of the preferred embodiment of the present invention. The letter A generally designates the die plate of the present invention adapted for use with a conventional extruder or pelletizer. Such an extruder or pelletizer is disclosed in U.S. Pat. No. 3,599,285, herein incorporated by reference for all purposes. While the extruder or pelletizer, per se, is conventional and does not form a part of this invention, by way of simplifying an understanding of the use of the die plate of the present invention, a brief description of the operation of such a device, such as shown in U.S. Pat. No. 3,599,285, will be given. As described in the aforementioned patent, the extruder is adapted to receive a feedstock of a suitable thermoplastic resin such as polyethylene, polypropylene or the like in a granulated form, and to convert the thermoplastic feedstock, via heat and/or pressure into a flowable, extrudable material which can be forced through an extrusion die, such as extrusion die A of the present invention. As shown in the referenced patent, the extruder has a hopper adapted to receive the granulated thermoplastic feedstock and a heating chamber wherein the feedstock is converted into its extrudable form. The extrudate is passed, in conventional manner, outwardly through a die, such as die A of the present invention. As the extruded thermoplastic resin exits the extrusion orifices of the die, generally in the form of rods or threads, it is severed into a series of generally uniform, cylindrically shaped pellets by a cutter assembly, such as the cutter assembly shown in the aforementioned patent, consisting of one or more cutter knives which are rotated or otherwise moved substantially against the discharge face of the die.

Figure 1:
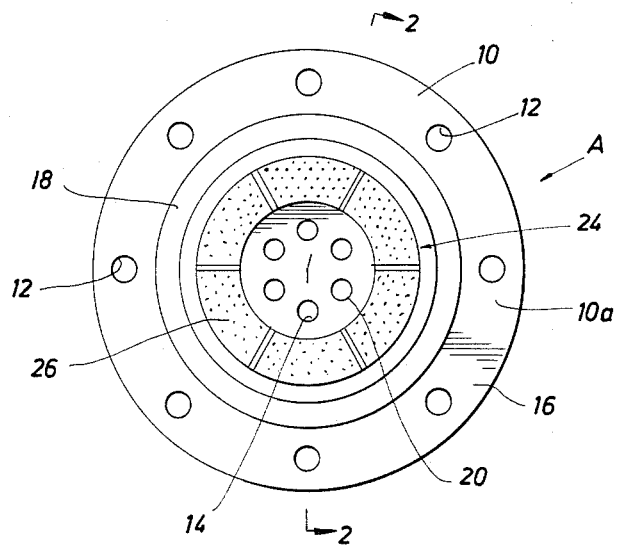
FIG. 1 is a simplified, frontal plan view of the extrusion die of the present invention.

Referring first to FIG. 1, the extrusion die A, which is generally cylindrical in nature, includes a die body 10 having a discharge side 10a and a feed or inlet side 10b, the designations as to discharge and inlet or feed referring to the flow path of the thermoplastic material being extruded through the die A. A series of circumferentially spaced bolt holes 12 and a series of radially inwardly disposed, circumferentially spaced bolt holes 14 cooperate to permit mounting of the extrusion die A to the pelletizer and to accommodate the cutter blade assembly as is well known in the art and described in the aforementioned patent.

Body 10 has an annular flange portion 16 and a radially inward, annular upset portion 18, bolt holes 12 being formed in flange portion 16. Body 10 further includes a central portion 20, an annular recess 22 being formed between central portion 20 and upset portion 18.

Received in annular recess 22 is a die insert shown generally as 24. As best seen with reference to FIG. 1, die insert 24 is generally annular and is carried by and secured to body 10 by means of welding, brazing or other affixing technique by which die insert 24 and die body 10 can be sealingly secured together.

Figure 2:
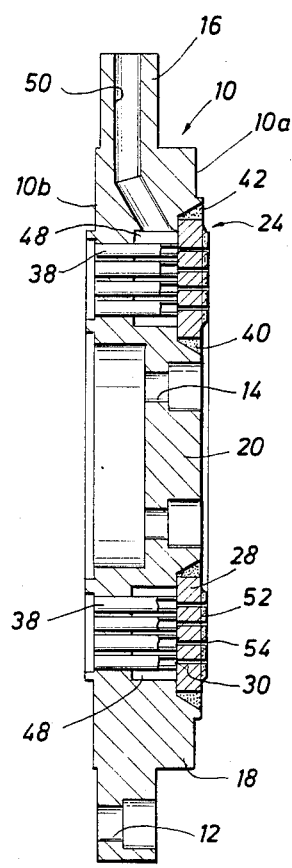
FIG. 2 is a cross-sectional view taken along the line 2—2 of FIG. 1.
Figure 3:
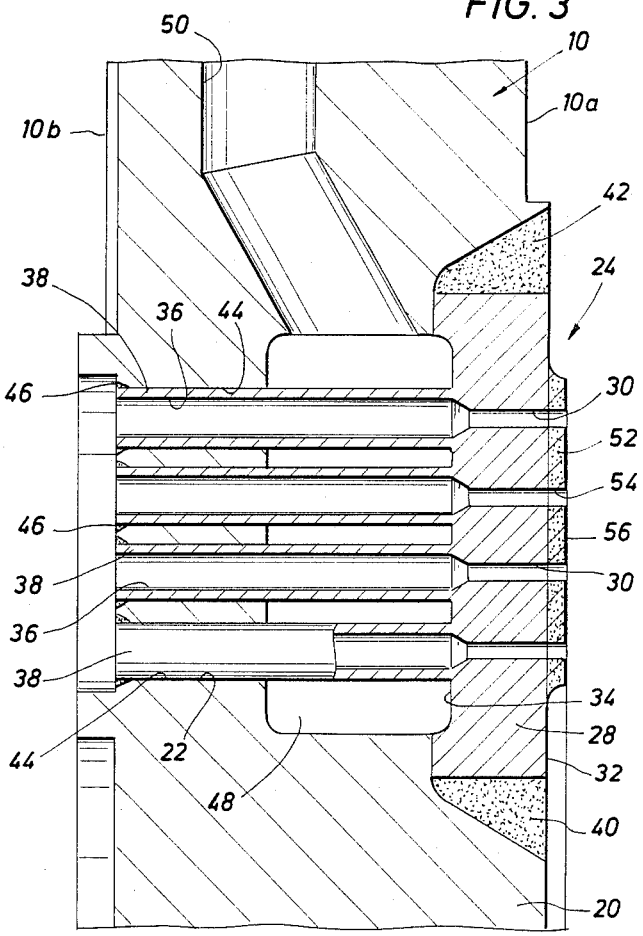
FIG. 3 is an enlarged, fragmentary view of a portion of the die shown in FIG. 2.

Referring now to FIGS. 2 and 3, die insert 24 is seen to comprise an annular die plate 28 provided with a plurality of spaced, generally parallel aligned extrusion ports 30 extending through the die plate 28 from a front surface or face 32 to a back surface 34. Ports 30 are generally cylindrical in cross section and communicate with and are in register with a plurality of ports or extrusion passageways 36, each of said ports 30 preferably being in register and in communication with a respective one of said passageways 36. Passageways 36 are formed by a plurality of formations or tubes, preferably cylindrical, 38 which project from the back surface 34 of die plate 28. Tubes 38 and die plate 28 comprise a monolithic structure formed from a unitary workpiece made of a relatively soft, easily machinable material such as stainless steel or the like. The advantages of such a monolithic structure will be explained more fully hereafter.

Insert 24, carried by body 10, is secured in annular recess 22 of body 10 by means of radially inner and radially outer annular welds 40 and 42, respectively, between die plate 28, and body 10. Tubes or formations 38 of die insert 24 are received in bores 44 extending through body 10 and opening onto the back side 10b thereof, formations 38 being secured to body 10 by welds as shown at 46. It will thus be seen that an annular cavity or heat exchange jacket 48 is formed, cavity 48 being defined at least partially by an annular recess in body 10 and generally by the back surface 24 of die plate 28. As can be seen, a portion of tubes or formations 38 are received in or extend through, and actually partially define, cavity 48. Two or more conduits such as conduit 50, only one of which is shown, open into cavity 48 and are used for the ingress and egress of a heating medium from a suitable source (not shown) such as steam, oil, etc. In essence, tubes 38 and cavity 48 with conduit 50 form a heat exchange of the shell and tube type.

Overlaying and secured to the face 32 of die plate 28 as by brazing, flame spraying, etc. is a nozzle plate 52 having a plurality of discharge nozzles 54, nozzles 54 being in open communication and in register with ports 30 in die plate 28. Nozzle plate 52 forms a generally planar discharge surface 56 across which the cutting knives move as the extrudate is discharged through nozzles 54 to be pelletized.

It will be appreciated that unless tubes 38 are efficiently heated during the extrusion process, thermoplastic materials such as polypropylene and certain polyethylenes as well as other thermoplastic resins which generally have a high degree of crystallinity and hence high melting points would have a tendency to solidify or at least become less fluid as they are forced through tubes 38. It is for this reason that tube or pipe die extrusion dies are designed such that the tubes pass through a cavity or heating jacket whereby a heating medium can be circulated in heat exchange relationship with the tubes.

As previously noted, die insert 24 comprised of die plate 28 and tubes or formations 38, is a monolithic structure being machined or otherwise made from a single piece of material. A desired method of forming die insert 24 is by electro discharge machining or die sinking, although other techniques may be employed. In heretofore known prior art structures, tubes or formations 38 were welded to the back surface 34 of die plate 28. Under these circumstances, the welds adjoining the tubes and the die plates were exposed to and indeed defined part of cavity 48 and accordingly were in contact with the heating medium in cavity 48. During the extrusion process, internal pressures in the tubes 38 can become quite high, particularly in the case of thermplastic materials having a high fractional melt index, materials which are generally more crystalline and have a higher melting point and accordingly are more difficult to extrude. Such materials generally require higher extruder pressures and temperatures with the consequence that the extrusion die is subjected to greater stresses as the exudate is forced through the passageways, such as passageways 36 and ports 30. In particular, tubes 38 being relatively flexible compared to die plate 28 are much more subject to deformation and flexing with the result that in prior art extrusion dies wherein the tubes 38 are welded to the backside of die plate 28, the welds distort and fail leading to cross-contamination of the heating medium in cavity 48 with the thermoplastic material in passageways 36. Such cross-contamination causes non-uniform extrusion rates in the discharge nozzle. The net result is the production of pellets of extruded thermosplastic material of non-uniform dimensions. Moreover, ultimately the extrusion die must be replaced or, in less severe cases, the tubes 38 rewelded to die plate 28. Since the die insert 24 of the present invention is monolithic, there are no welds or other securing means between tubes 38 and die plate 28 and hence the likelihood of failure at the juncture of the die plate and the tubes is greatly reduced.

In using the extrusion die assembly of the present invention, the thermoplastic material, in conventional manner, is heated to the extrusion temperature and then forced under pressure into the passageways 36 of tubes 38. As the fluidized thermoplastic resin passes through passageways 36, it has a tendency to cool and, if allowed to cool sufficiently could solidify plugging at least some of the passageways forcing higher flow rates and pressure in the other passageways and ultimately result in pellets of non-uniform dimensions. To circumvent this problem, a heating medium such as steam is introduced into the die via conduit 50 and then into cavity 48, the heating medium generally surrounding the portion of tubes 38 passing through cavity 48. Since tubes 38 and for that matter die insert 24 are generally made of a metallic material having high heat conductivity, rapid and efficient heat exchange occurs between the heating medium in cavity 48 and the thermoplastic material in passageways 36. Additionally, since die plate 28 is also in contact with the heating medium, generally uniform temperature is maintained in the material as it enters and passes through ports 30 in die plate 28 and is ultimately discharged through nozzles 54 in nozzle plate 52.

Figure 4:
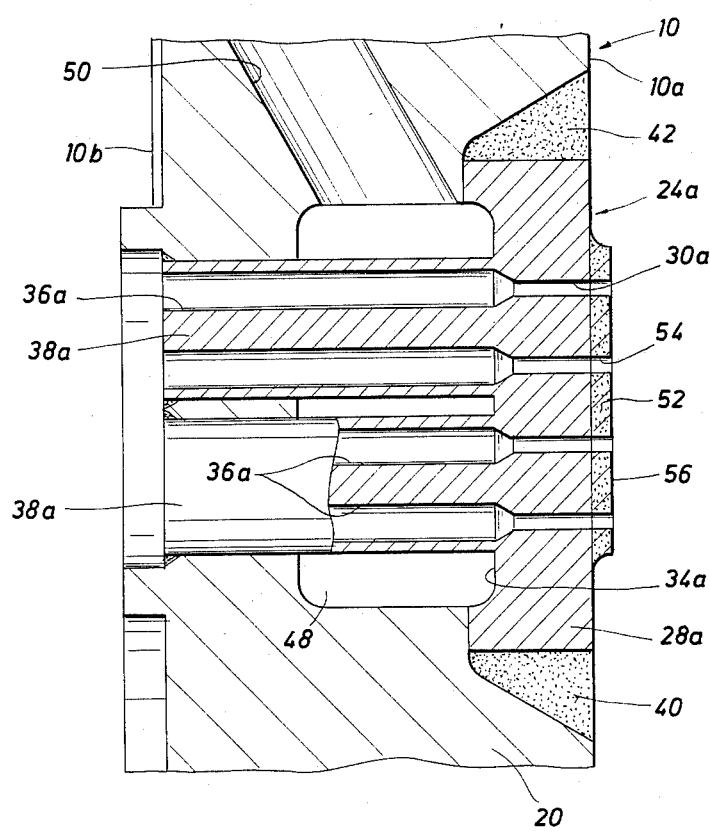
FIG. 4 is a view similar to FIG. 3 showing another embodiment of the extrusion die of the present invention.

Reference is now made to FIG. 4 for a modified embodiment of the extrusion die of the present invention. The die insert 24a shown in FIG. 4 differs from the die insert 24 of FIG. 3 in that there are a plurality of passageways 36a in each tube or formation 38 a . Each such passageway 38a is in open communication and in register with a corresponding port 30a in die plate 28a. It is still apparent, however, that tubes or formations 38a and die plate 28a are formed from a single piece of material into a monolithic structure avoiding the problems discussed above of having the tubes 38a and the back surface 34a of die plate 28a extend into and/or at least partially define heating jacket or cavity 48 whereby the heating medium therein is in excellent heat exchange relationship with tubes 38a and hence the thermoplastic or other extrudable material passing through passageways 36a.

Figure 5:
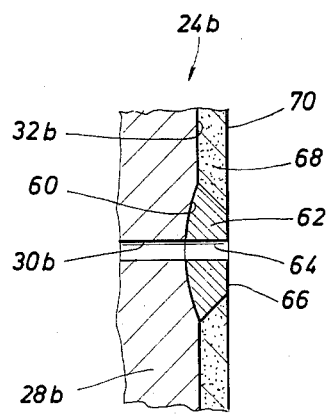
FIG. 5 is a cross-sectional, fragmentary view showing a nozzle plate construction for use in the extrusion die of the present invention.

Referring now to FIG. 5, there is shown a slightly modified nozzle plate construction for use with the extrusion die of the present invention. The construction shown in FIG. 5 is essentially that described in U.S. Pat. No. 4,167,386, incorporated herein by reference for all purposes. The die insert 24b of FIG. 5 includes a die plate 28b having ports 30b therein. For purposes of simplicity, the tubes or formations defining the extrusion passageways are not shown in FIG. 5, it being understood that such tubes, either such as those shown in FIG. 3 or FIG. 4, would be formed with die plate 28b in a monolithic structure. The face 32b of die plate 28b is formed with a series of spaced depressions 60, each depression 60 being in generally surrounding relationship to a respective port 30b. Disposed in each of depressions 60 is a protrusion 62 defining a discharge port 64, discharge port 64 and port 30b being in open communication and in register with one another. Protrusion 64 includes a substantially planar discharge surface 66 surrounding the orifice of port 64. Positioned on die plate face 32b in surrounding relationship to protrusion 62 and substantially filling the space between the spaced protrusions 62 is an abrasion resistant facing 68, facing 68 having a planar face which, together with discharge surfaces 66 forms a substantially planar discharge or nozzle plate face 70. The method of constructing the embodiment shown in FIG. 5 as well as the materials of construction are shown and described in detail in U.S. Pat. No. 4,167,386 referenced above. Suffice to say that protrusion 62 is generally formed of a unitary body of a machinable material having greater abrasion resistance than the material of die insert 24b.

Figure 6:
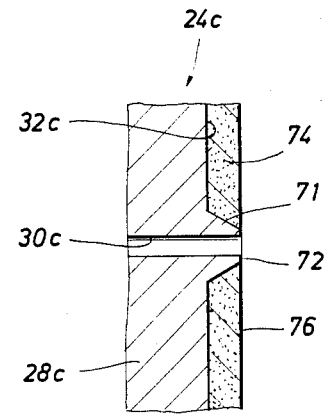
FIG. 6 is a view similar to FIG. 5 showing another embodiment of a nozzle plate construction for use in the extrusion die of the present invention.

Referring now to FIG. 6, there is shown still another embodiment of the nozzle plate construction for use in the die of the present invention, such nozzle plate construction being essentially the same as that shown and described in U.S. Pat. No. 3,599,285, incorporated herein by reference for all purposes. Referring then to FIG. 6, die insert 24c includes die plate 28c defining ports 30c, ports 30c being in communication and in register with extrusion passageways (not shown) in tubes or formations (not shown) such as tubes 38 or 38a, the tubes forming a monolithic structure with die plate 28c. Die plate 28c has a series of spaced protrusions 70 formed on the surface 32c and projecting outwardly therefrom. Protrusions 70, preferably also formed as a pair of a monolithic structure with the tubes and die plate 28c, terminate in a small but definable annular discharge surface 72 surrounding and indeed defining the orifice of ports 30c. Overlaying and affixed to die plate face 32c is an abrasion resistant facing 74, facing 74 substantially filling the space between the protrusions 71 and together with discharge surfaces 72 forming a substantially planar discharge face 76 over which the rotating knives move as the extruding thermoplastic material exit ports 30c. The precise method of construction and materials used in forming the embodiment shown in FIG. 6 is shown and described in U.S. Pat. No. 3,599,285, and, accordingly, further details of such construction need not be given herein.

The die insert of the present invention, regardless of the particular embodiment, is a monolithic structure wherein the term "monolithic structure" is intended to mean tubes, formations or the like defining extrusion passageways projecting from a die plate or base which in turn has extrusion ports, each of said extrusion ports being in register with a respective one of said extrusion passageways, the tubes and die plate or base being formed by machining, e.g. electro discharge machining, die sinking or other machining techniques, casting, etc. from a unitary piece of material such as stainless steel, mild steel, various alloys, etc.

The abrasion resistant material used to form the nozzle plates of the present invention, as is well known to those skilled in the art, will generally be made of a hard, wear-resistant material such as tungsten carbide, ceramics, wear-resistant alloys such as hardened metals of ferric content, silicon carbide, boron carbide, diamond, aluminum oxide, etc. Particularly preferred as an abrasion resistant material is tungsten carbide which is extremely hard and wear resistant and can be deposited on the die plate face relatively easily.

It will be apparent that the nozzle plate can be formed from projections such as 62 shown in FIG. 5 which are brazed and/or fused to a separate nozzle plate which in turn is brazed to the die plate face. Accordingly, the nozzle plate can be easily removed in the event of excessive wearing of the discharge surface and replaced or repaired. Such a method of fusing the nozzle plate offers certain advantages over fusing the nozzle plate by flame spraying as described in U.S. Pat. No. 4,167,386.

From the above description, it is apparent that numerous modifications may be made in the apparatus and method of the present invention without departing from the spirit or scope thereof. Accordingly, it is intended that the invention be limited only by the appended claims.

What is claimed is:

1. An extrusion die for a pelletizing apparatus comprising:
   a die body;
   a die insert carried by said die body and being rigidly secured thereto, said die insert including
      a die plate having a die plate face and a die plate back surface, said die plate having at least one first port extending therethrough, and
      at least one extrusion port formation projecting from said die plate back surface, said port formation defining at least one second port, said first port being in register with said second port, said die plate and said extrusion port formation comprising a monolithic structure; and
   a cavity defining a heat exchange chamber for circulation of a heating medium therein and being formed at least partially by said die body, at least a portion of said port formation being received in said cavity such that said port formation and said cavity form a heat exchanger of the shell and tube type whereby said heating medium is in direct heat exchange relationship with said portion of said port formation received in said cavity.

2. The die of claim 1 wherein there are a plurality of said first ports and said extrusion port formation defines a plurality of said second ports, each of said first ports being in register with a respective one of said second ports.

3. The die of claim 1 wherein there are a plurality of said first ports and a plurality of said extrusion port formations.

4. The die of claim 1 including a nozzle plate overlaying and secured to said die plate face, said nozzle plate being formed of an abrasion-resistant material having a substantially planar nozzle plate face, said nozzle plate having at least one discharge nozzle in register with said first and second ports.

5. The die of claim 4 wherein there are a plurality of said discharge nozzles in said nozzle plate, a plurality of said first ports in said die plate and a plurality of said second ports, each of said discharge nozzles being in register with a respective one of said first ports.

6. The die of claim 1 wherein said die insert further includes at least one protrusion projecting outwardly from said die plate face, said protrusion defining at least one third port, said third port being in register with said first and second ports, said protrusion having a substantially planar discharge surface surrounding said third port, and a facing of an abrasion resistant material positioned on said die plate face, said facing surrounding said protrusion and forming a substantially planar discharge face with said discharge surface on said protrusion.

7. The die of claim 6 wherein there are a plurality of said protrusions spaced on said die plate face, said protrusions defining a plurality of said third ports, and there are a plurality of said first ports in said die plate and a plurality of said extrusion port formations, each of said third ports being in register with a respective on of said first ports, said facing substantially filling the space between said protrusions, and forming a substantially planar discharge face with said discharge surfaces on said protrusions.

8. The die of claim 7 wherein said protrusions, said die plate and said die extrusion port formation comprise a monolithic structure.

9. The die of claims 6 wherein said protrusion is formed of a unitary body of a machinable material of greater abrasion resistance than the material of said die insert.

10. The die of claim 9 wherein said protrusions are disposed in a respective depression in said die plate face.

11. The die of claim 4 wherein said abrasion resistant material is comprised of a carbide material.

12. The die of claim 6 wherein said abrasion resistant material is comprised of a carbide material.

13. The die of claim 4 wherein said abrasion resistant material is comprised of a ceramic material.

14. The die of claim 6 wherein said abrasion resistant material is comprised of a ceramic material.

15. The die of claim 4 wherein said abrasion resistant material is comprised of an abrasion resistant alloy.

16. The die of claim 6 wherein said abrasion resistant material is comprised of an abrasion resistant alloy.

17. The die of claim 1 wherein said die insert is generally annular and is secured to said die body by welding.

18. The die of claim 1 wherein said cavity is at least partially formed by said die plate.

* * * * *